United States Patent [19]

Saunders et al.

[11] Patent Number: 5,257,555
[45] Date of Patent: Nov. 2, 1993

[54] THERMAL WIRE STRIPPER HAVING A STATIC DISCHARGE CIRCUIT

[75] Inventors: Ronald J. Saunders, Solana Beach; Douglas J. Korn, Escondido, both of Calif.

[73] Assignee: Teledyne Kinetics, San Diego, Calif.

[21] Appl. No.: 863,796

[22] Filed: Apr. 6, 1992

[51] Int. Cl.⁵ .................................. H02G 1/12
[52] U.S. Cl. ............................ 81/9.44; 219/221; 219/234
[58] Field of Search ............ 81/9.44, 9.4, 9.51; 219/227-241, 221; 307/326

[56] References Cited

U.S. PATENT DOCUMENTS

| Re. 30,342 | 7/1980 | Perrino | 81/9.5 B |
|---|---|---|---|
| 463,912 | 11/1891 | McVitty | |
| 1,131,473 | 3/1915 | Courtney | |
| 2,054,973 | 9/1936 | Ferguson | 81/9.5 |
| 2,451,463 | 10/1948 | Zimmermann | 81/9.5 |
| 2,978,565 | 4/1961 | Sullivan et al. | 219/29 |
| 3,143,635 | 8/1964 | Hooker | 219/221 |
| 3,152,239 | 10/1964 | Faulconer | 219/234 |
| 3,316,632 | 5/1967 | Bowers | 30/28 |
| 3,752,017 | 8/1973 | Lloyd et al. | 81/9.5 B |
| 3,771,222 | 11/1973 | Sakuma | 30/90.1 |
| 3,796,115 | 3/1974 | Dane | 81/9.5 B |
| 3,942,397 | 3/1976 | Tanaka | 81/9.5 A |
| 4,082,940 | 4/1978 | Knowles et al. | 219/227 |
| 4,094,213 | 6/1978 | Bradley | 81/9.5 R |
| 4,179,964 | 12/1979 | Kirkgasser et al. | 83/599 |
| 4,185,882 | 1/1980 | Johnson | 339/176 MP |
| 4,341,134 | 7/1982 | Yamazaki et al. | 81/9.5 A |
| 4,485,696 | 12/1984 | Bieganski | 81/9.5 A |
| 4,557,164 | 12/1985 | Krampe | 81/9.41 |
| 4,748,871 | 6/1988 | Zdzislaw | 81/9.4 |
| 4,850,108 | 7/1989 | Perrino et al. | 30/90.4 |
| 4,903,884 | 2/1990 | Royston et al. | 219/230 |
| 4,932,291 | 6/1990 | Potesta | 81/9.4 |
| 4,935,600 | 6/1990 | Pachschwoll | 219/241 |
| 5,023,997 | 6/1991 | Salvi | 30/175 |

OTHER PUBLICATIONS

AMP, *SIMM Sockets*, article, pp. 24–36.
AMP, *SIMM II Right Angle COnnectors*, article supplement, pp. 1–3.
Burndy, *Memorymate*, article, pp. 8–13 through 8–18.
Interconnection Products Incorporated, *Product Bulletin: Low Profile Connector for SIMM Modules*, article.
Molex, *Edge Connectors*, article, pp. 1F–11F.
PATCO, *Thermal WIre Strippers*, article/advertisement.
STRIPALL *Thermal Wire Stripper*, article/advertisement.

*Primary Examiner*—Roscoe V. Parker
*Attorney, Agent, or Firm*—Nydegger & Associates

[57] ABSTRACT

A hand-held thermal wire stripper has two arms arranged in a pincer-like configuration, whereby the arms diverge at one end and converge at the other end. The divergent ends of the arms are exposed and a heatable blade is positioned on each divergent end such that the two blades oppose each other across a gap that receives a wire to be stripped. The convergent ends of the arms are housed in a casing that is gripped by the operator of the wire stripper. The casing is formed from an electrostatically dissipative material that conducts electrostatic charges to ground before such charges reach a level sufficient to shock the operator or damage sensitive electrical components coming into contact therewith.

9 Claims, 1 Drawing Sheet

THERMAL WIRE STRIPPER HAVING A STATIC DISCHARGE CIRCUIT

FIELD OF THE INVENTION

The present invention pertains generally to wire stripping tools. More particularly, the present invention pertains to a pincer-like tool having heatable blades which is useful as a thermal wire stripper.

BACKGROUND OF THE INVENTION

Printed circuits are widely used in electronic devices to obviate wiring connections. A large number of electronic devices, nevertheless, continue to utilize internal and external wiring connections. In more sophisticated and complicated electronic devices containing wiring connections, it is particularly important that the connections are precise and secure. Since almost all wires used in electronic devices are manufactured with a protective insulative coating, it is necessary to initially remove the insulative coating from the wiring at the desired point of connection to properly effect a wiring connection.

Numerous wire strippers are known which remove a portion of an insulative coating from a wire for purposes of exposing the underlying portion of the wire conductor, thereby enabling effective connection of the wire with an internal or external electrical component. In general, wire strippers are designed to only cut through the insulator, minimizing damage to the underlying electrical conductor. To accomplish this, both mechanical and thermal wire strippers are known.

Most conventional wire strippers, whether mechanically or thermally operated, have a characteristic articulated twin-armed configuration with opposing blades that function as pincers. Typically, the devices are hand operated and are manipulated with one hand of the operator while the wire is held in the other hand.

Examples of known wire strippers include a thermal wire stripper that is disclosed in U.S. Pat. No. 4,932,291 to Potesta which employs electrically heated blades that melt through the insulative coating of a wire and enable its removal from the wire. U.S. Pat. No. 4,557,164 to Krampe discloses a mechanical wire stripper having sharpened blades that physically cut through the insulative coating of a wire for the same purpose.

Thermal wire strippers are favored for many precision applications because the thermal stripping process minimizes the force applied by the stripper blade to the wire conductor. With mechanical wire strippers, this force is relatively large causing undesirable nicking or scratching of the wire conductor by the blades. Although thermal wire strippers avoid this problem, their use is not entirely problem-free.

Conventional thermal wire strippers, such as those described above typically have an electrically and thermally insulative casing, by which the operator holds the stripper. The casing material is commonly a non-conductive high-strength plastic which functions to protect the operator from the heat and electric current running through the body of the stripper. The plastic casing material, however, is undesirably subject to the buildup of electrostatic charges therein.

An electrostatic charge buildup in the stripper casing is undesirable from both a safety and an operational standpoint. From a safety standpoint, the electrostatic charge in the casing can transmit an electric shock to the operator of the stripper when the operator grasps the casing. From an operational standpoint, the electrostatic charge in the casing can be conducted to the wire being stripped, should the wire accidentally come into contact with casing. The resulting current could in turn be conducted from the wire into sensitive electrical components in communication with the wire, thereby resulting in damage to the components.

Accordingly, a need exists for a twin-armed thermal wire stripper that minimizes the risk of conducting electric current to the wire being stripped. More particularly, a need exists for a twin-armed thermal wire stripper that avoids the buildup of electrostatic charges in the elements of the stripper which could come in contact with the wire stripper operator or the wire being stripped. A further need exists for a twin-armed thermal wire stripper satisfying these criteria which is easy to use, relatively simple to manufacture and comparatively cost effective.

SUMMARY OF THE INVENTION

The present invention is a thermal wire stripper having two arms arranged in a pincer-like configuration. Each arm has a mounting member at its convergent proximal end, a blade at its divergent distal end, and a pair of extension members connecting the blade and mounting member. The blades of the two arms are opposingly positioned on the divergent distal ends of the arms. The blades and extension members are formed from a material that has both a high electrical conductivity and a high thermal conductivity. Any number of metals satisfy these criteria. In contrast, the mounting members are formed from a material that is thermally and electrically non-conductive relative to the blades and extension members. High-strength rigid plastics typify such materials.

The mounting members are housed in a casing formed from an electrostatically dissipative material which is thermally non-conductive relative to the blades and extension members, but is nevertheless somewhat electrically conductive relative to the mounting members. The electrostatically dissipative material may be characterized as having sufficient electrical conductivity to conduct electrostatic charges that build up in the casing to ground before such charges reach a level sufficient to shock the operator of the stripper or to damage sensitive electrical components coming into electrical communication therewith.

A preferred electrostatically dissipative material for use in the casing is a heterogeneous material comprising a first non-electrically conductive constituent and a second constituent that is at least somewhat more electrically conductive than the first constituent. The first constituent is preferably a rigid plastic and the second is preferably carbon or a metal which may be uniformly distributed throughout the plastic. The casing is preferably a unitary piece molded from this material.

The wire stripper is also provided with an electrically conductive element, preferably in the form of a metal strap, which facilitates electrical connection of the casing to ground. The strap, being more electrically conductive than the casing, readily carries away any electrostatic charges that build up in the casing. The ground is provided in conjunction with a voltage source supplying electrical current to the arms which is used to heat the blades. Connection of the strap to ground is across a ground wire that is encased within the power line from the voltage source to the wire stripper.

In further accordance with the present invention, the power line containing the ground wire may be provided with an external sheath formed from an electrostatically dissipative material similar to that of the casing. The material of the sheath, however, differs from that of the casing in that it should be sufficiently flexible so as not to impair the maneuverability of the power line. The sheath surrounds the electrically insulative coating of the line and, being coextensive with the power line, is in communication with the ground of the voltage source. The sheath consequently serves to conduct electrostatic charges building up on the surface of the power line to ground, thereby obviating the risk of conducting an electric current to the operator or to sensitive electrical components.

In operation, the wire stripper of the present invention has a resting position and an activated position. In the resting position, the arms are biased apart, thereby maintaining a sufficient gap between the opposing blades to enable placement of a coated wire to be stripped between the blades. The operator transfers the wire stripper to the activated position by urging the distal ends of the arms toward one another, thereby closing the gap between the blades and bringing the blades into contact with the insulative coating on the wire positioned therebetween.

As the blades are closed together, the power line conducts electricity from the voltage source to heating elements that are contained within the extension members. The heating elements convert the electric current to heat that is transferred to the blades where it melts the insulative coating from the wire. The wire is then withdrawn from between the blades, producing a portion of exposed wire conductor for use in an effective electrical connection.

Throughout the operation of the wire stripper, electrostatic charges that may build up in the casing and power line of the wire stripper are dissipated to ground. Accordingly the wire stripper of the present invention effectively avoids the buildup of substantial electrostatic charges which could be conducted to the wire stripper operator or the wire being stripped. Furthermore, it is apparent that the present wire stripper is easy to use as well as relatively simple and comparatively cost effective to manufacture.

The features of this invention, both as to its structure and operation, are further understood from the accompanying drawings, taken in conjunction with the accompanying description, in which similar reference characters refer to similar parts.

DESCRIPTION OF THE PREFERRED EMBODIMENTS

Figure 1:
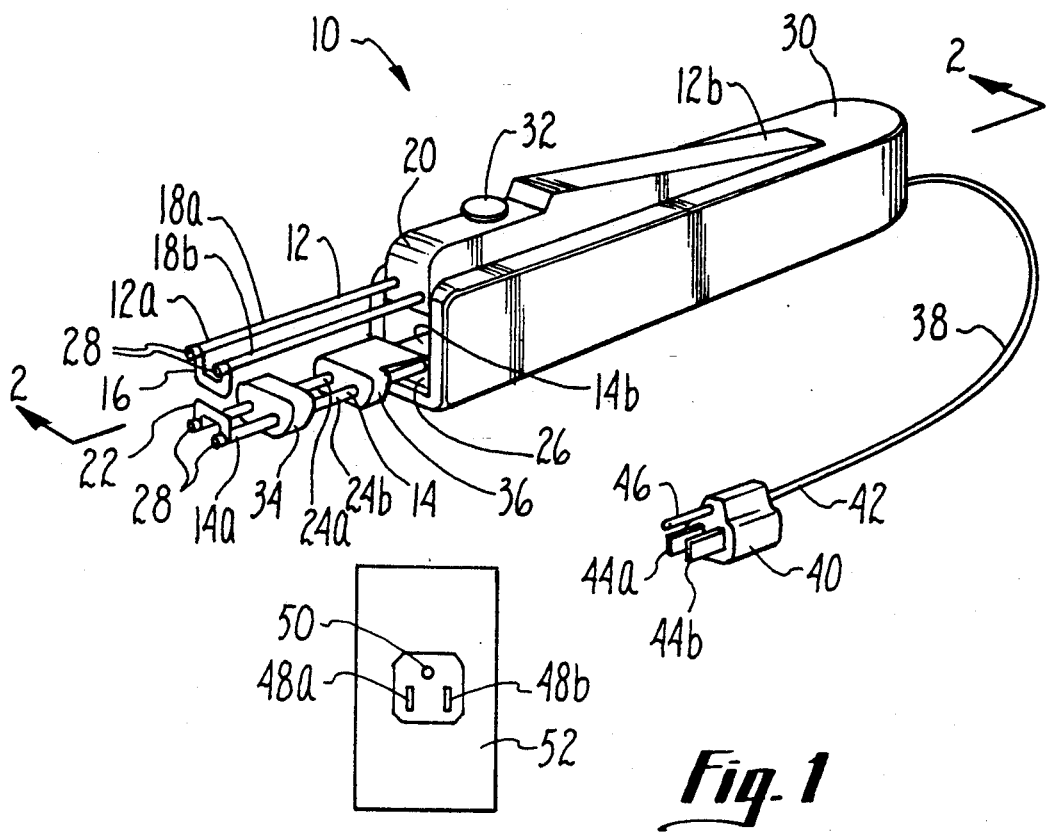
FIG. 1 is a perspective view of the wire stripper of the present invention.

Referring initially to FIG. 1, the thermal wire stripper of the present invention is shown and generally designated as 10. The wire stripper 10 has a pivotable upper arm 12 with a divergent end 12a and a convergent end 12b, and a substantially stationary lower arm 14 with a divergent end 14a and a convergent end 14b. Upper arm 12 includes a distal blade 16 at divergent end 12a, a pair of extension members 18a and 18b, and a proximal mounting member 20 at convergent end 12b. Lower arm 14 similarly includes a distal blade 22 at divergent end 14a, a pair of extension members 24a and 24b, and a proximal mounting member 26 at convergent end 14b. The terms proximal and distal are used herein to denote relative positions with respect to an operator holding wire stripper 10. Blades 16 and 22 are attached to extension members 18a, 18b and 24a, 24b respectively by conventional fasteners such as screws 28.

A proximal casing 30 houses mounting members 20, 26 and serves as a handle by which the operator manually grips thermal wire stripper 10. Positioned on mounting member 20 is a button 32 for manually activating a power switch described below with reference to FIG. 2. Further shown on wire stripper 10 of FIG. 1 is a limiter 34 slidably engaging extension members 18a, 18b and a stabilizer 36 fixably connected to extension members 18a, 18b and mounting member 26.

A sheathed power line 38 extends from casing 30 and terminates in a conventional three-pronged plug 40 at its opposite end 42 from wire stripper 10. Prongs 44a, 44b are alternating current-bearing leads while prong 46 is a ground lead. Prongs 44a, 44b, 46 are receivable by receptacles 48a, 48b, 50 of a common wall outlet 52. Receptacles 44a, 44b are connected to a voltage source, such as a municipal power line conducting household current (not shown), and receptacle 50 is connected to the outlet ground (not shown).

Blades 16, 22 and extension members 18a, 18b, 24a, 24b are formed from a material that has both a high electrical conductivity and a high thermal conductivity. Preferably, blades 16, 22 and extension members 18a, 18b, 24a, 24b are formed from a rigid metal such as stainless steel. Mounting members 20, 26 are formed from a material that is thermally and electrically non-conductive relative to the blades 16, 22 and extension members 18a, 18b, 24a, 24b. Preferably, mounting members 20, 26 are formed from a heat-resistant, high-strength, rigid, homogeneous plastic such as nylon. Mounting members 20, 26 effectively insulate casing 30 both electrically and thermally from blades 16, 22 and extension members 18a, 18b, 24a, 24b.

Casing 30 is molded from an electrostatically dissipative material which is thermally non-conductive relative to metals, but is somewhat electrically conductive relative to plastics. The electrostatically dissipative material has sufficient electrical conductivity to conduct electrostatic charges that build up in casing 30 during normal operation to ground before such charges reach a level sufficient to shock the operator of stripper 10 or to damage sensitive electrical components coming into electrical communication with casing 30.

A preferred electrostatically dissipative material used in casing 30 is a heterogeneous material comprising a high-strength, rigid plastic, such as nylon, which is thermally and electrically non-conductive and a minority fraction of carbon or a metal distributed throughout the plastic, which is at least somewhat electrically conductive. The minority fraction is typically on the order of about 5 percent by weight. This combination of heterogeneous constituents renders casing 30 sufficiently electrically conductive to dissipate electrostatic charges therefrom to ground.

The internal components of thermal wire stripper 10 are further described with reference to FIG. 2. Housed within casing 30 is a step-down transformer 54 that reduces the voltage of the high-voltage alternating current from power line 38 to a low-voltage alternating current for use by stripper 10. Power line 38 includes a sheath 56 formed from an electrostatically dissipative material similar to that of casing 30, but wherein the plastic is pliant rather than rigid to facilitate manipulation of line 38. Sheath 56 surrounds a plurality of wires that are preferably individually insulatively coated, although for clarity the thin insulative wire coating is not shown here. The wires include a positive high-voltage ac wire 58, a negative high-voltage ac wire 60 and a ground wire 62.

Wires 58, 60 are connected to transformer 54 in electrical communication therewith, while wire 62 is connected to the ground lead 64 of transformer 54. Extension members 18a, 24a have low-voltage ac wires 66a, 66b connected thereto which extend from transformer 54. More particularly, low-voltage ac wires 66a, 66b are connected to resistance heating elements (not shown) that are internally contained within extension members 18a, 24a and wires 66a, 66b conduct low-voltage alternating current into the elements. Similar low-voltage ac wires (not shown) are connected from transformer 54 to resistance heating elements in extension members 18b, 24b.

A power switch 68 is provided in mounting member 20 across which positive high-voltage ac wire 58 is connected to transformer 54. A pair of switch wires 70, 72 are further provided to complete the link from positive high-voltage ac wire 58 across switch 68 and back to transformer 54. In the view of FIG. 2, wire 72 is partially obscured by wire 70, although it is apparent that wire 72 follows a somewhat similar path to that of wire 70 from switch 68 to transformer 54.

Power switch 68 employs a spring 74 to bias activator button 32 upward. Spring 74 maintains switch 68 in the off position, i.e., open, until button 32 is manually depressed against spring 74, thereby placing switch 68 in the on position, i.e., closed, and allowing high-voltage alternating current to reach transformer 54. A spring 76 is also provided between mounting member 20 and transformer 54 to bias pivotal mounting member 20 upward and maintain a gap 78 between blades 16 and 22. Gap 78 is closed by manually depressing mounting member 20 against spring 76 such that mounting member 20 rotates about pivot 80 that is defined by the edge against which member 20 abuts transformer 54.

In contrast to pivotal mounting member 20, mounting member 26 is substantially stationary relative to stripper 10, being fixed to casing 30. Extension members 18a, 18b and 24a, 24b are also fixably attached to mounting members 20 and 26 respectively. Attachment of extension members 24a, 24b to mounting member 26 is further secured by stabilizer 36 independently linking extension members 24a, 24b to mounting member 26.

Finally, an electrically conductive metal strap 82, preferably formed from brass, is provided within casing 30 to electrically connect casing 30 to ground wire 62 at ground lead 64. Strap 82 is more electrically conductive than casing 30 and as such carries away any electrostatic charges that build up in casing 30 to ground receptacle 50.

OPERATION

Figure 2:
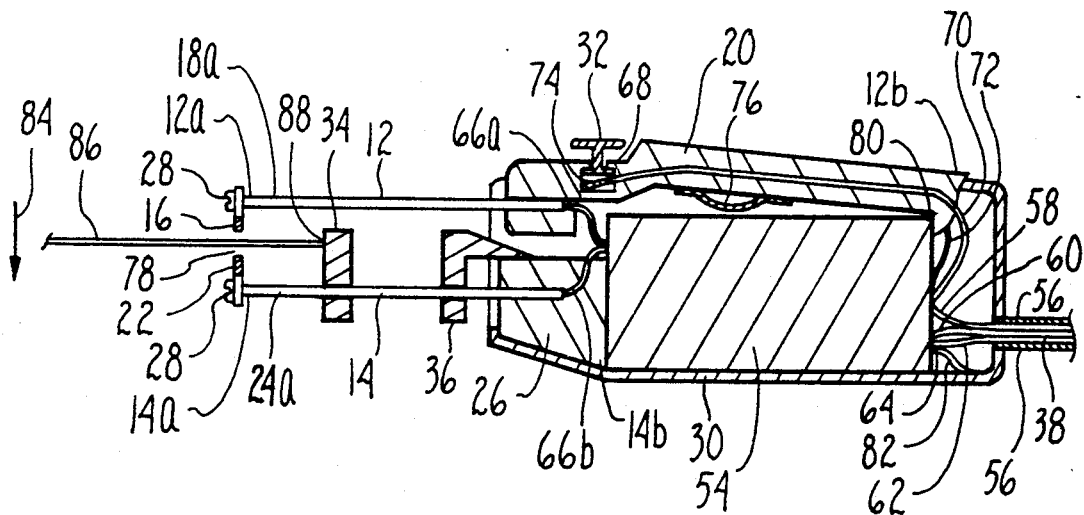
FIG. 2 is a cross-sectional view of the wire stripper of the present invention as seen along the line 2—2 in FIG. 1 with the wire stripper in the resting position.

Operation of thermal wire stripper 10 is described hereafter with reference to FIGS. 1 and 2. In general, wire stripper 10 is operated by moving mounting member 20 between a resting position, wherein gap 78 is maintained open as shown in FIG. 2, and an activated position wherein gap 78 closes in the direction of arrow 84. More particularly, operation is initiated with wire stripper 10 in the resting position, wherein spring 76 biases upper arm 12 away from lower arm 14 to distance blade 16 from blade 22. Plug 40 is inserted into wall outlet 52, thereby feeding an electric current to wire stripper 10 while grounding the internal components thereof. An insulatively coated wire 86 to be stripped is then manually placed by the operator between the blades 16, 22 with end 88 abutting limiter 34.

The distance between limiter 34 and blade 22 is adjustable by sliding limiter 34 backward or forward along extension members 24a, 24b. As can be appreciated, this distance establishes the amount of wire 86 that can be stripped by wire stripper 10 at a given time.

With wire 86 gripped by the operator in one hand and positioned in wire stripper 10 as shown in FIG. 2, the operator grips wire stripper 10 in the other hand about casing 30, mounting member 20, and button 32. The operator then simultaneously depresses button 32 to close switch 68 while pressing against mounting member 20 to rotate it downwardly about pivot 80. Closure of switch 68 supplies low-voltage current to the heating elements in extension members 18a, 18b, 24a, 24b, thereby heating blades 16, 22.

Downward rotation of mounting member 20 causes blade 16 to close downward in the direction of arrow 84 against wire 86. Heated blades 16, 22 melt the insulation surrounding the axial conductor of wire 86 at their points of contact. Once the insulative coating has been melted, wire 86 is withdrawn through blades 16, 22, thereby stripping all of the insulative coating away from the conductor along the distance from blade 22 to limiter 34. Once wire 86 has been stripped, mounting member 20 is released and spring 76 returns wire stripper to its resting position. The operation can then be repeated as desired.

Throughout the operation of wire stripper 10, electrostatic charges that build up on casing 30 are dissipated to ground receptacle 50 of outlet 52 by conduction across strap 82, ground lead 64, ground wire 62, and ground prong 46. Similarly, electrostatic charges that build up on power line 38 are dissipated to ground receptacle 50 by conduction across sheath 56.

While the particular thermal wire stripper as herein shown and disclosed in detail is fully capable of obtaining the objects and providing the advantages hereinbefore stated, it is to be understood that the wire stripper is merely illustrative of the presently preferred embodiments of the invention and that other embodiments are possible within the scope of the present invention.

We claim:

1. A thermal wire stripper comprising:
   a first arm and a second arm, each having a convergent end and a divergent end;
   a first blade at said divergent end of said first arm, and a second blade at said divergent end of said second arm, said first and second blades positioned in opposition to each other and formed from a material having a relatively high thermal conductivity;
   a first mounting member at said convergent end of said first arm, and a second mounting member at said convergent end of said second arm, wherein said first and second mounting members are formed from a material having relatively low thermal and electrical conductivities;
   means for heating said first and second blades;
   a casing housing said first and second mounting members, wherein said casing is formed from a heterogeneous material having a relatively intermediate electrical conductivity and a relatively low thermal conductivity, and wherein said casing material comprises a mixture of a major constituent having a relatively low electrical conductivity and a minor constituent having a relatively high electrical conductivity; and an electrical conductor attached to said casing and in electrical communication with a ground, wherein said electrical conductor is formed from a material having a relatively high electrical conductivity.

2. A thermal wire stripper as recited in claim 1, wherein said heating means comprises a voltage source in electrical communication with said first and second arms via a power line having a ground wire connected to said ground, and further wherein said electrical conductor is in electrical communication with said ground via said ground wire.

3. A thermal wire stripper as recited in claim 2 wherein said power line has a sheath having a relatively intermediate electrical conductivity and surrounding said ground wire, and further wherein said sheath is in electrical communication with said ground.

4. A thermal wire stripper as recited in claim 1 wherein said mounting members are formed from a homogeneous plastic.

5. A thermal wire stripper as recited in claim 1 wherein the weight fraction of said major constituent in said heterogeneous material is substantially greater than the weight fraction of said minor constituent.

6. A thermal wire stripper as recited in claim 1 wherein said mounting members electrically and thermally insulate said casing from said first and second blades.

7. A thermal wire stripper comprising:
 a first arm and a second arm, each having a convergent end and a divergent end;
 a first blade at said divergent end of said first arm, and a second blade at said divergent end of said second arm, wherein said first and second blades are positioned in opposition to each other and are formed from a material having a relatively high thermal conductivity;
 a first mounting member at said convergent end of said first arm, and a second mounting member at said convergent end of said second arm, wherein said first and second mounting members are formed from a material having relatively low thermal and electrical conductivities;
 a voltage source in electrical communication with said first and second arms via a power line for heating said first and second blades, said power line having a ground wire connected to a ground;
 an electrostatically dissipative casing housing said first and second mounting members, wherein said casing is formed from an insulating plastic impregnated with a relatively small fraction of an electrically conducting material; and
 an electrical conductor attached to said casing and in electrical communication with said ground via said ground wire, wherein said electrical conductor is formed from a material having a relatively high electrical conductivity.

8. A thermal wire stripper as recited in claim 7 wherein said power line has a sheath having a relatively intermediate electrical conductivity and surrounding said ground wire, and further wherein said sheath is in electrical communication with said ground.

9. A thermal wire stripper, comprising:
 an electrostatically dissipative housing;
 first and second thermally conductive stripping arms mounted in said housing;
 first and second thermally conductive stripping blades conductively mounted on said first and second stripping arms and aligned for wire stripping;
 a plurality of electrical resistance heating elements conductively connected to said first and second stripping arms; and
 an electrical power source mounted in said housing and electrically connected to said heating elements; wherein
 said housing is thermally and electrically insulated from said stripping arms, said heating elements, and said power source; and
 said housing is constructed from a heterogeneous mixture of about 95% of a first, non-conductive material, and about 5% of a second, conductive material.

* * * * *